E. B. FISH.
ROLL OR SPOOL CENTERING DEVICE.
APPLICATION FILED MAY 2, 1916.
1,234,746.
Patented July 31, 1917.
2 SHEETS—SHEET 1.
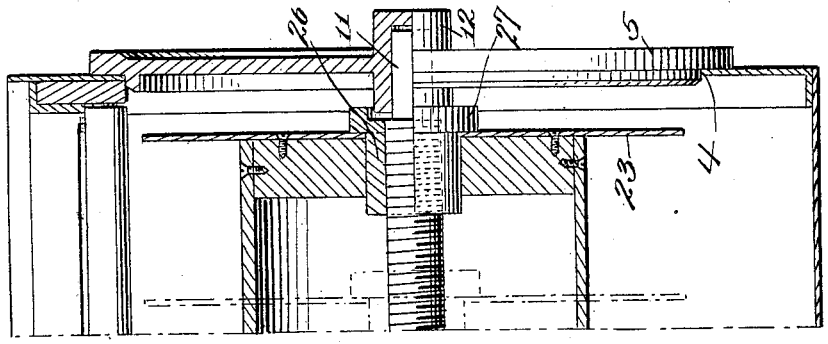
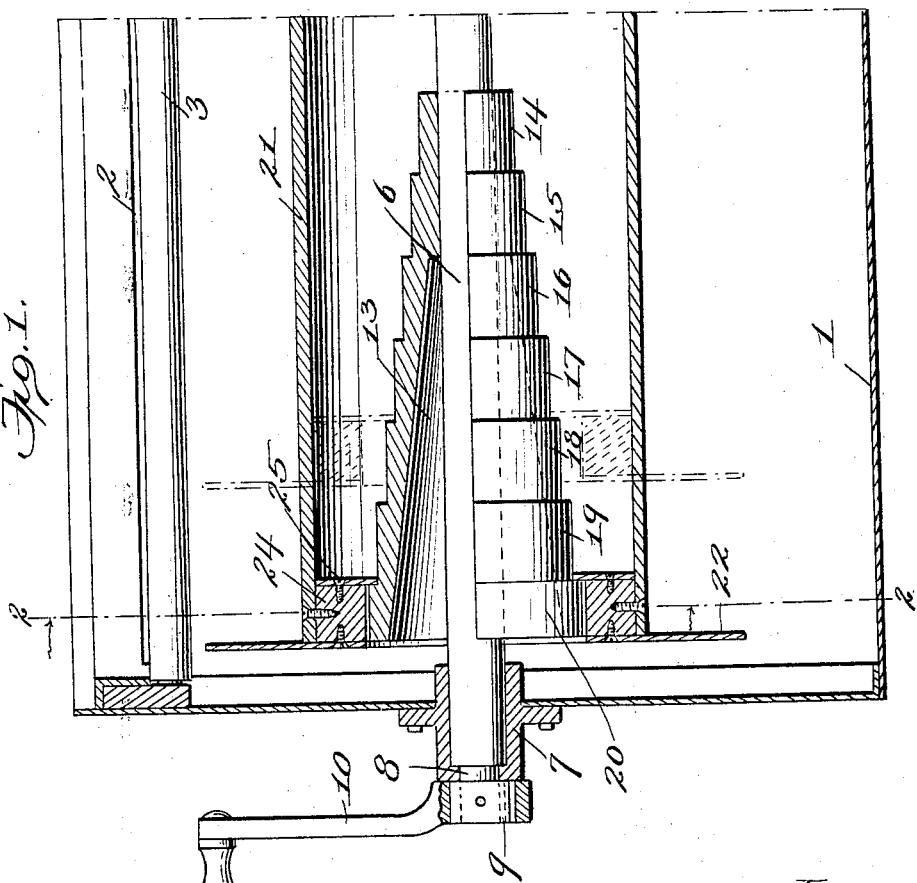
Witnesses
Inventor
Ezra B. Fish
by
Attorney E. B. FISH.
ROLL OR SPOOL CENTERING DEVICE.
APPLICATION FILED MAY 2, 1916.
1,234,746.
Patented July 31, 1917.
2 SHEETS—SHEET 2.
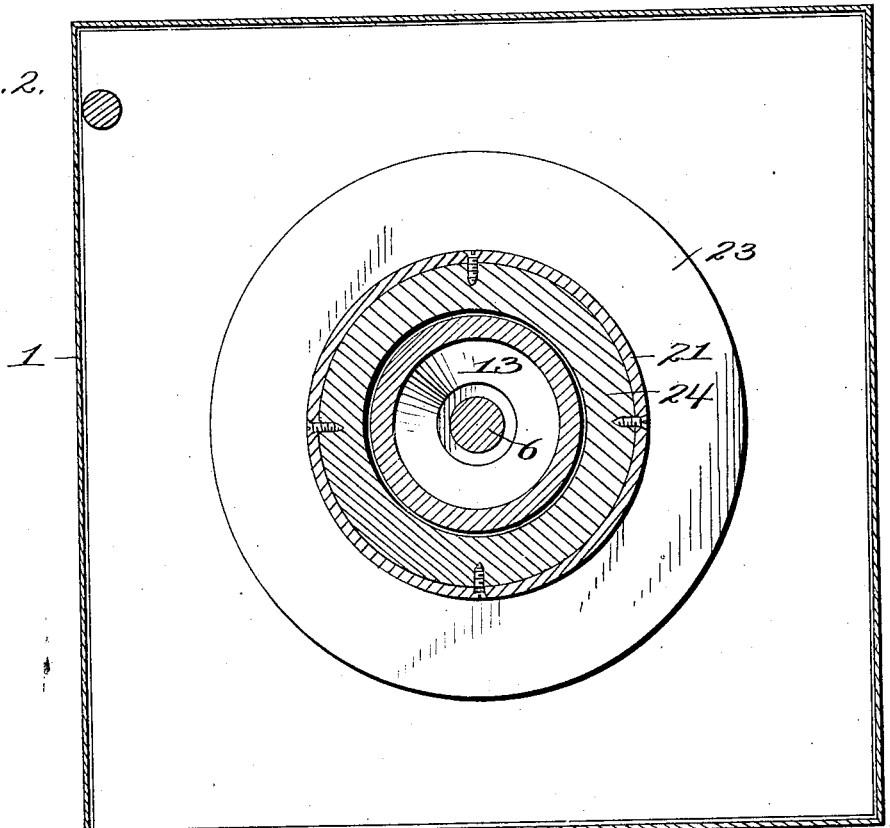
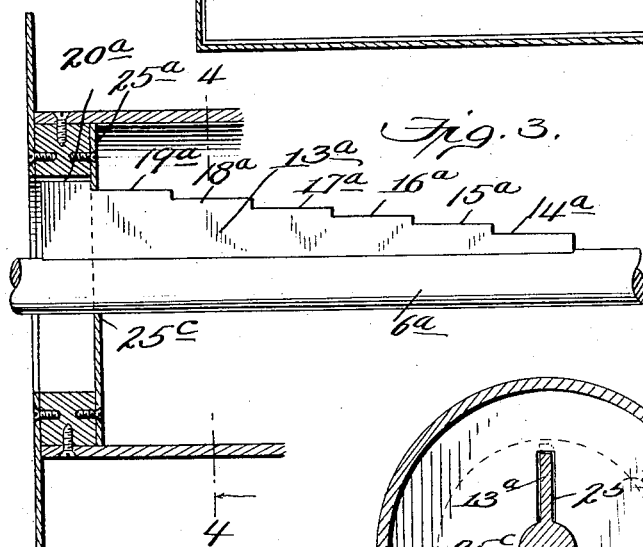
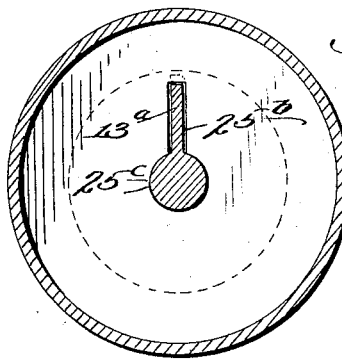
Inventor
Ezra B. Fish

UNITED STATES PATENT OFFICE.

EZRA B. FISH, OF KANSAS CITY, MISSOURI, ASSIGNOR TO THE CAMERAGRAPH COMPANY, OF KANSAS CITY, MISSOURI, A CORPORATION OF MAINE.

ROLL OR SPOOL CENTERING DEVICE.

1,234,746.      Specification of Letters Patent.      Patented July 31, 1917.

Application filed May 2, 1916. Serial No. 95,011.

*To all whom it may concern:*

Be it known that I, EZRA B. FISH, a citizen of the United States, residing at Kansas City, in the county of Jackson and State of Missouri, have invented new and useful Improvements in Roll or Spool Centering Devices, of which the following is a specification.

My present invention relates to improvements in means for supporting and centering roll-holders or spools adapted to contain a strip or web of paper or other material, and the primary object of the invention is to provide means for centering such rolls or spools longitudinally with respect to a median line of the strip or web, although rolls or spools of different lengths and containing strips or webs of different widths may be used, the strip or web in each instance having its median line set in a central or other predetermined position.

The present invention is particularly applicable to photographic apparatus, to afford the advantage of setting and maintaining with facility the median line of the sensitized strip in a central or other predetermined position relatively to the optical axis of the lens, although strips of photographic material of different widths may be used. An example of a photographic apparatus for making photographic reproductions from books, documents or the like and to which the present invention may be applied with advantage is shown and described in Letters Patent No. 929,757, granted August 3, 1909, to Calvin J. Ellis.

With these and other ends in view, the invention consists of certain improvements and the combinations and arrangements of parts all as will be hereinafter more fully described, the features of novelty being pointed out particularly in the claims.

In the drawings:—

Figure 1 represents a section taken longitudinally through a magazine or roll holding casing, the same being provided with a roll or spool centering device constructed in accordance with one embodiment of the invention.

Fig. 2 represents a section on the line 2—2 of Fig. 1 and looking in the direction of the arrow.

Fig. 3 is a detail view of another embodiment of the invention showing a portion of a spool supporting shaft and a spool centered longitudinally thereon, and Fig. 4 represents a section on the line 4—4 of Fig. 3 looking in the direction of the arrow.

Similar parts are designated by the same reference characters in the several views.

The present invention is applicable generally to apparatus of various kinds wherein it is desirable or necessary to center or otherwise position the median line of a strip or web, as unwound from a roll or spool, in relation to a coöperating part of the apparatus. The invention is shown in the accompanying drawing, and will be hereinafter described as applied to photographic apparatus of the type wherein photographic exposures are made successively on a strip or web of sensitized material, which material is supplied to the machine in a roll or on a spool, the present invention providing means for centering or otherwise positioning the median line of the sensitized strip relatively to the optical axis of the lens. It is to be understood that the invention is not restricted to the particular construction shown, as modifications may be made and equivalent constructions used within the scope of the claims.

In the present instance, 1 designates the magazine or casing which is adapted to receive the roll or spool. This magazine, when used for photographic apparatus, is closed or light-tight, it having a slot 2 through which the strip or web passes as the same unwinds from the roll or spool, and a guide roller 3 for directing the strip from the roll or spool to the slot. One end of the magazine or casing has an opening 4 through which the roll or spool may be inserted and removed. A cover 5 is removably fitted to the opening 4 and when it is in closed position it closes this opening.

The roll or spool is supported in the magazine or casing by a shaft 6. Preferably, and as shown, one end of the shaft is mounted and supported permanently in one end of the casing and in consequence it will be unnecessary to remove the shaft when it is desirable or necessary to apply or remove a roll or spool. The means shown for permanently supporting the shaft in the casing comprises a bearing 7 which is riveted or otherwise secured to the solid end wall of the casing, this end of the shaft having a reduced end 8 which extends through a correspondingly reduced portion of the bearing, and an angular-shaped handle receiving part 9 is fixed to the reduced portion of the shaft exteriorly of the bearing. The handle 10 serves to rewind the strip or web upon the roll or spool when such is necessary. The opposite end of the shaft is formed with a journal 11 over which the bearing 12 formed in the cover 5 is removably fitted, this construction enabling the cover to be removed while the shaft remains supported by the bearing 7 at the opposite end thereof.

The present invention provides means for centering or positioning rolls or spools in a direction longitudinally of the shaft, although the rolls or spools may be of different lengths. In the construction shown in Figs. 1 and 2, a set of steps or shoulders is provided, the steps or shoulders of the set being located at different points longitudinally of the shaft, and the steps or shoulders increasing progressively in size toward one end of the shaft. As shown, a member 13 is fixed on the shaft toward one end thereof, and this member is formed with a set of annular or cylindrical portions 14, 15, 16, 17, 18, 19 and 20, these annular or cylindrical portions being all concentric with the shaft but increasing progressively in diameter as they approach that end of the shaft which is supported by the bearing 7. Because of the varying diameters of these annular or cylindrical portions, shoulders or abutments of progressively increasing sizes or diameters are formed, and these shoulders or abutments are spaced longitudinally of the shaft. Each shoulder serves, as will hereinafter appear, to center or otherwise position a roll or a spool of a different length in a direction longitudinally of the shaft. Seven rolls or spool-positioning shoulders are shown in the present instance, but it is to be understood that the number of these shoulders may be varied as desired.

In the construction shown a spool is illustrated applied to the shaft, this spool being adapted to contain a roll of sensitized paper or other material. The spool as shown comprises a cylindrical body 21 and end flanges 22 and 23 which latter are secured at the ends of the body. The strip or web is usually contained in a roll wound upon the body 21 between the end flanges. According to the present invention the spools or roll holders of different lengths and containing strips or webs of different widths are provided with parts which correspond and are adapted to coöperate with the respective positioning steps or shoulders on the shaft so that when a spool or roll holder containing a strip or web is placed upon the shaft the spool or holder will be centered or otherwise set in a predetermined position longitudinally of the shaft, irrespective of the length of the spool or holder or the width of the strip of web thereon.

In Figs. 1 and 2 each spool or roll holder is provided at one end with a ring 24 which is bored to provide an opening sufficiently large to permit it to be applied upon the member 13. These rings 24 for all the spools adapted to be used, may be duplicates. Each spool or roll holder is also provided with a positioning member or disk 25, it being preferable to secure this member to the inner side of the ring 24, by means of screws, as shown, or in any other suitable manner, and the member 25 of each spool or roll holder will have an internal bore the size of which will depend upon the length of the spool or roll holder. For example, as shown, the member 25 has an internal bore or aperture large enough to permit it to pass over the next largest annular portion 19 of the member 13 and to abut against the shoulder formed between the stepped annular portions 19 and 20. In Fig. 1 a spool or roll holder of maximum length is shown on the shaft. For a spool or roll holder of less length and which contains a strip or web of less width, the member 25 for such a spool or roll holder will have a correspondingly smaller aperture. For example, the dotted lines of Fig. 1 show the member 25 with an aperture of the size that will cause it to abut against the shoulder formed between the stepped annular portions 17 and 18, the spool in that instance being two sizes smaller than the spool of maximum length. In the same way, spools of other lengths may be employed, it being necessary only to provide these spools with members 25 which have apertures therein of sizes to abut against the corresponding shoulders of the member 13. The spool is applied to the shaft while the cover 5 is removed. In employing the present invention for the purpose of centering spools of different lengths on a shaft or support, the flange 23 of the different spools will occupy different positions along the length of the shaft as the length of the spool varies. In order to retain the different spools on the shaft and to form a driving connection between the different spools of the shaft, a device is provided which operates preferably against the flange 23 of the spool, forcing the member 25 against its shoulder on the member 13, such device being adjustable longitudinally of the shaft in order to accommodate itself to the position occupied by the flange 23. As shown, a nut 26 is threaded on the shaft and has a flange 27 to abut against the flange 23 of the spool as a clamp, the flange 27 of the nut being exposed for manipulation.

In the construction shown in Figs. 3 and 4, the shaft 6ᵃ is provided with steps or shoulders, but these steps or shoulders are formed on the outer edge of a tongue or key 13ª, the tongue or key being fixed to the shaft, and, as shown, it projects radially therefrom. The outer edge of the tongue or key 13ª is formed with steps 14ª to 20ª, shoulders being formed between these steps to position spools of different lengths longitudinally of the shaft. Each spool is provided with a positioning member 25ª which is secured therein and has a slot 25ᵇ of a size that will enable it to engage the appropriate shoulder on the stepped key, and a substantially circular opening 25ᶜ to fit around the shaft and thereby support this end of the spool concentrically thereon. For example, Fig. 3 shows a spool of maximum length, the member 25ª of this spool being positioned by the shoulder formed between the steps 19ª and 20ª. The spools of shorter length will be provided with positioning members 25ª having slots of smaller sizes, whereby they will abut against the shoulders corresponding to these shorter length spools, thereby centering or otherwise positioning the spool in a direction longitudinally of the shaft.

In either of the constructions shown, the longitudinally spaced steps or shoulders of different sizes serve to automatically center or position spools or roll holders of different lengths in a direction longitudinally of the shaft, the same shaft or spool support being used for various spools and it being necessary only to provide the spools of different lengths with positioning members having apertures or slots of different sizes to correspond to the steps or shoulders provided for them.

What I claim is:—

1. A device for longitudinally centering spools of different lengths, comprising a shaft having shoulders varying progressively in size and spaced longitudinally of the shaft, said shoulders being adapted to coöperate respectively with spools of different lengths and having apertures of different sizes corresponding to the sizes of said shoulders.

2. A device for longitudinally centering spools of different lengths, comprising a support having shoulders located thereon at different positions longitudinally and varying progressively in size, said shoulders adapted to coöperate respectively with spools of different lengths having apertures of different sizes corresponding to the sizes of said shoulders.

3. A device of the character described, comprising a support having a set of shoulders located at different positions longitudinally of the support and increasing progressively in size toward one end thereof, and a spool adapted to be applied endwise to the support and having a part to coöperate with one of said shoulders to position the spool on the support.

4. A device of the character described, comprising a support having a set of shoulders located at different positions longitudinally of the support and increasing progressively in size toward one end thereof, and a spool adapted to be applied endwise to the support and having a part provided with an aperture of a size determined by the length of the spool and of a size to coöperate with the corresponding shoulder to position the spool longitudinally on the support.

5. A device of the character described, comprising a support having a set of shoulders located at different positions longitudinally of the support and increasing progressively in size toward one end thereof, and a spool adapted to be applied endwise to the support and having a part to coöperate with one of said shoulders to position the spool on the support, and means on the support for holding said part of the spool in coöperative relation with said shoulder.

6. A device of the character described, comprising a support having a set of shoulders located at different positions longitudinally of the support and increasing progressively in size toward one end thereof, and a spool adapted to be applied endwise to the support and having a part to coöperate with one of said shoulders to position the spool on the support, and means adjustable longitudinally on the support to coöperate with an end of the spool and thereby hold said part of the spool in coöperative relation with its corresponding shoulder.

7. A device of the character described comprising a shaft having a set of longitudinally spaced steps adapted to coöperate respectively with spools having apertures of different sizes corresponding to said steps.

8. A device of the character described comprising a shaft having a set of longitudinally spaced stepped shoulders to coöperate respectively with spools of different lengths having parts to abut against the corresponding shoulders, and means movable longitudinally of the shaft and adapted to coöperate with the ends of spools of different lengths to clamp the same against the respective shoulders on the shaft.

9. The combination of a shaft having a set of longitudinally spaced shoulders which increase progressively in height toward one end of the shaft, a clamp adjustable longitudinally at the opposite end of the shaft, and a spool adapted to be applied endwise to the shaft and having a part provided with an aperture of a size corresponding to that of one of the shoulders, the clamp serving to hold said part of the spool in engagement with its respective shoulder.

10. The combination of a casing, a shaft permanently mounted therein at one end, means on the shaft for longitudinally centering spools of different lengths on the shaft, and axially adjustable means on the opposite end of the shaft for removably retaining the different spools on the shaft.

In testimony whereof I have hereunto set my hand in presence of two subscribing witnesses.

EZRA B. FISH.

Witnesses:
JOSEPH G. HAWTHORNE,
CLIFTON O. RANDALL, Jr.

Copies of this patent may be obtained for five cents each, by addressing the "Commissioner of Patents, Washington, D. C."